(12) United States Patent
Staszewski (10) Patent No.: US 6,191,716 B1
(45) Date of Patent: Feb. 20, 2001

(54) HIGH-SPEED DIGITAL CIRCUIT EMPLOYING A BAND-ZERO-DETERMINATION-ASIDE (BØDA) ARCHITECTURE

(75) Inventor: Robert B. Staszewski, Garland, TX (US)

(73) Assignee: Texas Instruments Incorporated, Dallas, TX (US)

(*) Notice: Under 35 U.S.C. 154(b), the term of this patent shall be extended for 0 days.

(21) Appl. No.: 09/322,671

(22) Filed: May 28, 1999

Related U.S. Application Data (63) Continuation-in-part of application No. 09/224,364, filed on Dec. 31, 1998, which is a continuation-in-part of application No. 09/256,568, filed on Feb. 24, 1999, which is a continuation-in-part of application No. 09/258,045, filed on Feb. 25, 1999, which is a continuation-in-part of application No. 09/256,420, filed on Feb. 24, 1999, which is a continuation-in-part of application No. 09/258,594, filed on Feb. 26, 1999, which is a continuation-in-part of application No. 09/258,827, filed on Feb. 25, 1999.
(60) Provisional application No. 60/122,219, filed on Mar. 1, 1999.

(51) Int. Cl.[7] ............................................. H03M 1/62
(52) U.S. Cl. ................................... 341/139; 341/123
(58) Field of Search ................................. 341/122, 123, 341/139, 155

(56) References Cited

U.S. PATENT DOCUMENTS 5,134,402 * 7/1992 Miyoshi .............................. 341/144
5,389,927 * 2/1995 Turney et al. ........................ 341/139
5,438,460 * 8/1995 Coker et al. ......................... 341/139
5,815,101 * 9/1998 Fonte .................................. 341/123

* cited by examiner

*Primary Examiner*—Michael Tokar
*Assistant Examiner*—Don Phu Le
(74) *Attorney, Agent, or Firm*—W. Daniel Swayze, Jr.; Wade James Brady, III; Frederick J. Telecky, Jr.

(57) ABSTRACT

A system and a method for calculating a value for the "Band Zero" (BØ) contribution to the processing of a digital signal by processing the separate parts of the signal at separate times. The method increases operating speed of a feedback circuit, for example, by providing a processing path (402f) that is not on the main high-speed processing path of a system such as a read channel of a disk drive. By processing the most time-consuming determination "in parallel," the high-speed portion of processing is able to maintain an optimum throughput. The method also lends itself to processing in those applications where more than one mode is used. For example, when used in a read channel (113) of a disk drive (100) employing a FIR filter, three modes are desired: FIR-bypass, acquisition, and data tracking. Being able to switch easily among the three modes provided for in a read channel (113) of a disk drive (100) demonstrates the adaptability of the method and supporting structure to a broad class of feedback circuits used in systems employing high throughput rates.

50 Claims, 3 Drawing Sheets

FIG. 4

HIGH-SPEED DIGITAL CIRCUIT EMPLOYING A BAND-ZERO-DETERMINATION-ASIDE (BØDA) ARCHITECTURE

CROSS REFERENCES TO RELATED APPLICATIONS

This application claims the benefit of prior filed copending provisional application Ser. No. 60/122,219, filed Mar. 1, 1999.

This application is a continuation-in-part of copending patent application 09/224,364, filed Dec. 31, 1998, which is a continuation-in-part of copending patent application 09/256,568, filed Feb. 24, 1999, which is a continuation-in-part of copending patent application 09/258,045, filed Feb. 25, 1999, which is a continuation-in-part of copending patent application 09/256,420, filed Feb. 24, 1999, which is a continuation-in-part of copending patent application 09/258,594, filed Feb. 26, 1999, which is a continuation-in-part of copending patent application 09/258,827, filed Feb. 25, 1999, all of which are hereby incorporated by reference.

BACKGROUND OF THE INVENTION

1. Field of the Invention

This invention relates to improvements in systems, methods, and circuits for increasing throughput rate and operational speed of a signal processor, and more particularly, to improvements in systems, methods, and circuits to perform the processing necessary to determine "band zero" of a digital signal while separated from the high-speed path in which other parts of the signal are being processed.

2. Relevant Background

In the construction of mass data storage devices, or the like, in particular in the construction of the data channel used in digital magnetic recording systems, or the like, there has been significant recent interest in Partial Response Maximum-Likelihood (PRML) signaling techniques. The most common PRML systems are PR4ML (a partial response class 4) and EPR4ML (extended partial response class 4). Maximum-likelihood detectors, which use a Viterbi algorithm, are generally used in these partial response channels.

The various partial response techniques are generally referred to by the particular partial response target that it uses. For example, a PR4 partial response target is $(1-D)*(1+D)$, and an EPR4 partial response target is $(1-D)*(1+D)^2$, where D is a delay operator equal to $e^{j\omega t}$, where $\omega$ is frequency, and t is delay time. Recently an EEPR4 (or $E^2PR4$) response level has been introduced in which the EEPR4 partial response target is $(1-D)*(1+D)^3$.

In general, the various partial response techniques that are employed use different sampling times at which the signal that is derived from the disk drive transducer are sampled and measured. A PR4 Partial Response System typically results in data that is contained in three separate bands, often referred to as band 1, band 0, and band −1. An EPR4 technique results in sampling bands commonly referred to as band 2, band 1, band 0, band −1, band −2. The data within the bands is not contained on a single time band value, but instead, have a distribution about the centerline of the band.

In the past, processing the data to separate it into its respective bands required considerable data processing with serial comparisons. Thus, calculation of band data is usually a data processing bottleneck since the subsequent steps rely on it and cannot be performed until the band has been calculated. Therefore, with increased emphasis on high-speed data acquisition and processing, this band determination processing is being regarded as one of the processes that slows the overall processing time for the data.

In general, a "digital signal" is a signal that conveys a discrete number of values at discrete times. This is in contrast an "analog signal," i.e., a signal that conveys an infinite number of values on a time continuum. A signal having a digital form may be generated from an analog signal through sampling and quantizing the analog signal. Sampling an analog signal refers to "chopping" the signal into discrete time periods and capturing an amplitude value from the signal in selected ones of those periods. The captured value becomes the value of the digital signal during that sample period. Such a captured value is referred to as a sample.

Quantizing refers to approximating a sample with a value that may be represented on a like digital signal. For example, a sample may lie between two values characterized upon the digital signal. The value nearest (in absolute value) to the sample may be used to represent the sample. Alternatively, the sample may be represented by the lower of the two values between which the sample lies. After quantization, a sample from an analog signal may be conveyed as a digital signal. This is the resultant signal soon which the digital circuit may operate.

A digital signal processor (DSP) transforms an input digital signal to an output digital signal. For the digital filter, the transformation involves filtering out undesired portions of the received digital signal. An original analog signal may be represented as a sum of a plurality of sinusoids. Each sinusoid oscillates at a particular and unique frequency. Filtering is used to remove certain frequencies from an input signal while leaving other frequencies intact.

Programs executing on digital circuits often do so in "real-time." Real-time programs can be regarded as programs that must execute within a certain time interval. Regardless of whether a program executes in a large period of time or a small period of time, the result of executing the program is the same. However, if real-time programs attempt to execute in an amount of time longer than the required time interval, then they no longer will compute the desired result.

Programs executing on a digital circuit are real-time programs, since the instructions manipulate a sample of a digital signal during the interval preceding the receipt of the next sample. If the program cannot complete manipulating a sample before the next sample is provided, then the program will eventually begin to "lose" samples. A lost sample does not get processed; therefore, the output signal of the digital circuit will no longer contain all of the information from the input signal provided to the digital circuit. This potential for losing samples is reduced by a preferred embodiment of the present invention, while maintaining a required throughput rate.

A digital circuit may be programmed to modify signals. The number of instructions required to do this is relatively fixed. The digital circuit must be capable of executing this relatively fixed number of instructions on any given sample before the next sample of the series is provided.

Besides considering the throughput of a digital circuit, most all of the design parameters have associated cost factors that should be considered. One important cost factor is the silicon area needed to "house" the digital circuit. Those circuits that are manufactured on a relatively small silicon chip are less expensive than those requiring a large chip. Therefore, an easily manufacturable, small (low cost) digital circuit is desirable.

A "pipelining" method may be used to achieve better filter performance at high input data rates. One cost of using this method, however, is increased latency. At very high speeds, such as are being seen with newer systems, conventional pipelining falls subject to the law of diminishing returns. The pipelining "overhead" now consumes a larger percentage of the benefits gained from higher clock speeds. The overhead consists of a required latching or reclocking stage for every pipelining command. Generally, the performance improvement for one level of pipelining is less than two while the "on-chip" cost increase is greater than two. All the while this is occurring at the very high clock rate of the input data. The preferred embodiment of the present invention addresses the clock rate limitation imposed by a high data rate input signal, in particular during feedback control operations.

SUMMARY OF THE INVENTION

A preferred embodiment of the present invention provides a system and method for increasing the speed of operation of a high-speed digital circuit, by providing separate paths for processing parts of the input signal, without appreciably increasing "on-chip" real estate.

Processing parts of a signal in separate paths enables optimization of he high-speed portion of a digital circuit, providing adequate time for processing each sample in the high-speed portion. By having one path operate on a calculation intensive portion of the processing and providing for certain operations to be made common to each path, required on-chip area is also reduced compared to conventional digital circuits of comparable performance.

A preferred embodiment of the present invention Is implemented for use by a timing recovery circuit. In a preferred embodiment of the present invention, the signal that is being processed within a timing recovery loop has been previously encoded in a partial response (PR) architecture for further processing in a maximum likelihood (ML) detector, such as a Viterbi Detector. Further, the use of simple two-way multiplexers, i.e., +1 and −1, in a preferred embodiment of the present invention on the high-speed path(s) facilitates higher operating frequency.

Some of the salient advantages of the present invention are that it:

significantly increases throughput and operational speed.

reduces required silicon area on the chip, considering the performance improvement.

uses simpler multiplexers.

reduces latency.

enables separate circuit paths to share functions.

reduces fabrication cost.

enables optimum processing on high-speed portions of a digital circuit.

BRIEF DESCRIPTION OF DRAWINGS

The invention is illustrated in the accompanying drawings, in which.

In the various figures of the drawings, like reference numerals are used to denote like or similar parts.

DETAILED DESCRIPTION OF THE PREFERRED EMBODIMENTS

Figure 1:
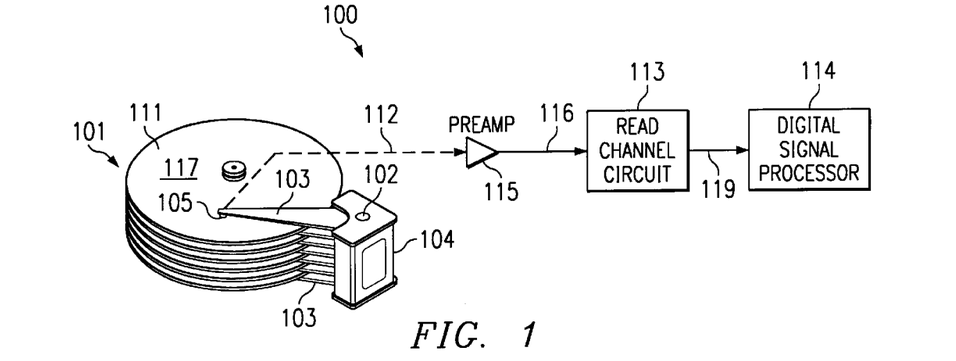
FIG. 1 is a block diagram of a disk drive and its read channel circuit, together with inputs and outputs therefrom in which the system and method in accordance with a preferred embodiment of the invention may be employed.

FIG. 1 is a diagram of a portion of the parts of a mass data storage device 100, including part of its read channel circuitry 113. The hard disk drive 101 contains several magnetic disks 111, each containing data on its magnetic surface 117, and each associated with an arm 103 controlled by a voice coil motor 104. The arms are connected to a spindle 102 that is rotated by a spindle motor (not shown).

At the outer end of each arm 103 lies a read/write head 105 for reading from and writing to a respective one of the disks 111. A magnetic disk output signal 112 from read/write head 105 is input to a preamplifier 115 that, in turn, outputs amplified signal 116 to read channel cIrcuit 113. The output signal is transmitted on a path 119 from the read channel circuit 113 to a controller or digital signal processor 114. A preferred embodiment of the present invention is contained within the read channel circuitry 113.

Figure 2:
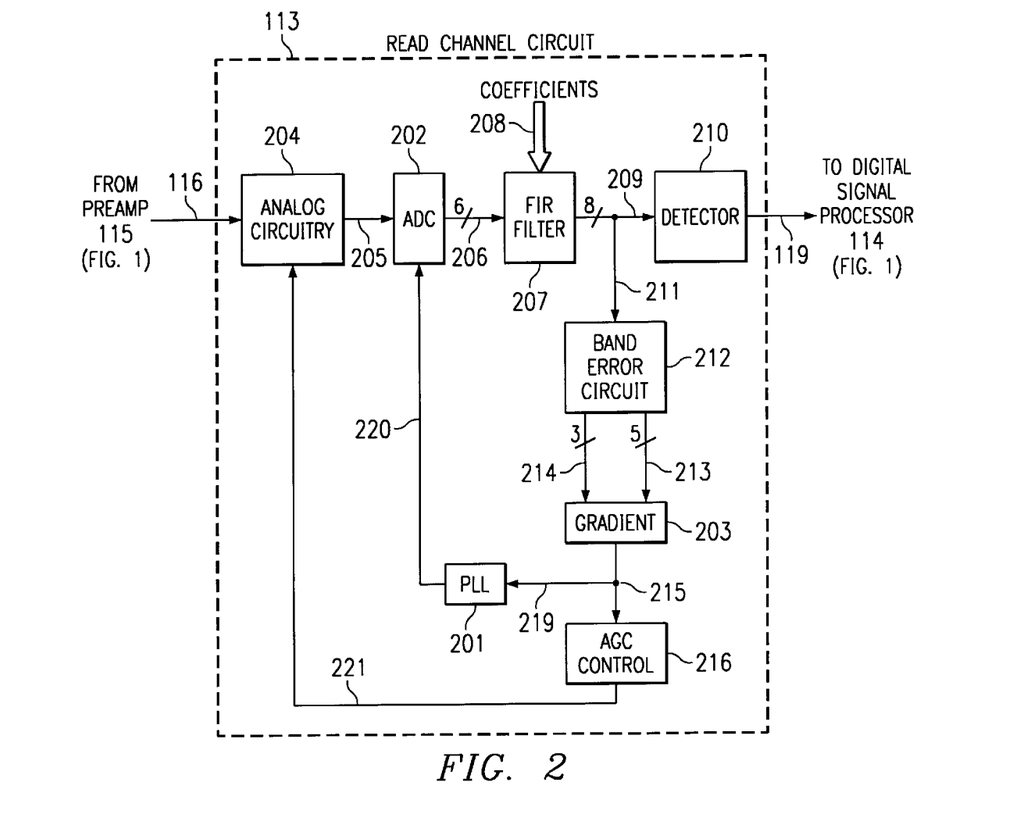
FIG. 2 is a block diagram of a portion of the read channel circuit of FIG. 1.

With reference now additionally to FIG. 2, additional details of the read channel circuit 113 of FIG. 1 and circuitry for applying time and gain control are shown. FIG. 2 is provided as an example of a method of providing timing and gain control, permitting an understanding of the concepts leading to a preferred embodiment of the present invention.

Shown as an input to the circuit 113 is the output signal 116 of preamplifier 115 of FIG. 1 that conditioned the read signal 112 from the disk 111. The analog circuitry 204 may be, for example, an analog CTF filter, which provides gain amplification and initial signal conditioning during signal processing within the read channel circuitry 113. A conditioned analog signal is provided on path 205 from the analog circuitry 204 to an analog-to-digital converter (ADC) 202. A preferred embodiment includes a 6-bit digital signal output from ADC 202 on path 206 to a FIR filter 207 having taps (not shown), each associated with a coefficient 208 provided by source (not shown) external to the read channel circuitry 113. An 8-bit filtered digital output signal is provided on path 209 to a detector 210 for output on path 119 to the digital signal processor 114.

In one embodiment, a second path 211 is provided for feedback purposes to a band/error detection circuit 212. It is the modification to the band/error circuit 212 that comprises one example of a preferred embodiment of the present invention. The band/error detection circuit 212 has a first output, which is a 5-bit error signal on path 213 and a second output, which is a 3-bit signal hand on path 214, to a gradient circuit 203 containing timing and gain gradient circuits (not separately shown).

An output signal is provided from the gradient block 203 on path 215 to automatic gain control (AGC) circuitry 216 from a gain gradient circuit within the block 203. From the AGC 216 an adjustment, or feedback, signal is provided on path 221 to the analog circuitry 204. Another output signal from the timing gradient circuit in block 203 is sent on path 219 to a phase locked loop (PLL) 201. From the PLL 201, a feedback of phase adjustment signal is sent on path 220 to the ADC 202.

Figure 3:
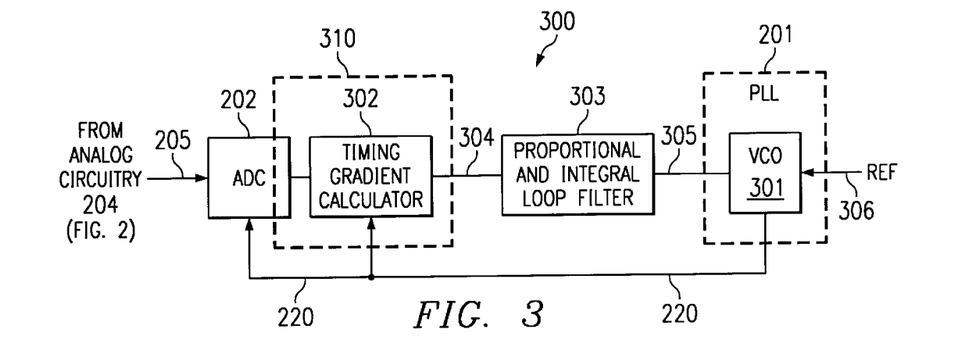
FIG. 3 is a block diagram showing a conventional phase lock loop therefrom in which the system and method in accordance with a preferred embodiment of the invention may be employed.

With reference now additionally to FIG. 3, a block diagram of a timing recovery loop 300 is shown. The digital PLL 201 employs a VCO 301 to generate the sampling clock for the ADC 202, which, as described above, receives an input from the analog circuitry 204 along path 205. In order to lock the PLL 201 to a required sampling frequency and phase, a sinusoidal signal (not shown) at one-fourth the sampling frequency (¼T, where T is the bit period) is injected into the ADC 202. An error is computed using the results from timing gradient (TG) circuit(s) (not shown, but included in block 203 of FIG. 2).

Timing gradient calculator 302 provides an input over path 304 to a proportional-and-integral (P&I) loop filter 303 that is connected via path 305 to the VCO 301. In turn, the VCO 301 receives a reference signal from an external source (not shown) over path 306. The VCO 301 provides adjustment or feedback signals over paths 507 to the timing gradient calculators 302 as well as to the ADC 202, as described above. It should be noted that what is conventionally termed as a phase detector is included herein. In the final stages of ADC 202 and the timing gradient calculators as depicted by dashed block 310. FIG. 3 is provided as an example of a method of providing timing and phase control, permitting an understanding of the concepts leading to a preferred embodiment of the present invention.

Figure 4:
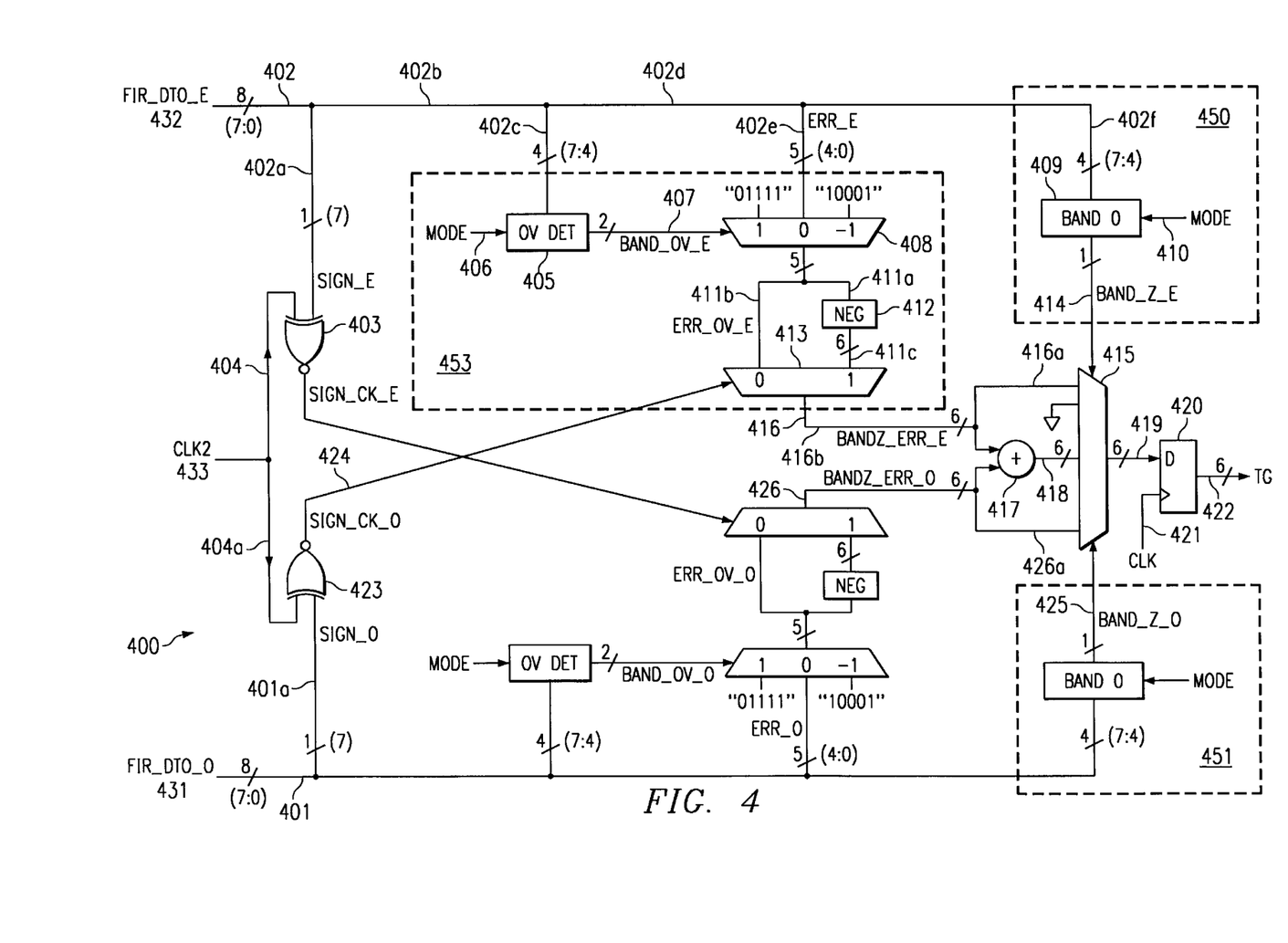
FIG. 4 is a detailed block diagram of a portion of a phase detector in a data-tracking mode according to a preferred embodiment of the invention.

FIG. 4 depicts a preferred embodiment of the present invention operating in data-tracking mode. Viewing the top half of FIG. 4, i.e., the EVEN bit stream, FIR_DTO_E 432 on path 402 is processed on path 402a, with a most significant bit (MSB) (7) being provided to determine the sign SIGN_E at XNOR gate 403 together with signal CTK 2 433 on path 404. The clock signal CLK 2 is also provided to the bottom "mirrored" half of circuit 400 along path 404a. Details of the construction and operation of the mirrored circuit halves are set forth in copending patent application Ser. No. 09/256,420, filed Feb. 24, 1999, incorporated herein by reference. It should be noted that XNOR gate 403 and XOR gate 423 are used only when there is internal parallelism, i.e., if an external parallel structure is used, the gates 403 and 423 would not have to be used.

Following path 402 to paths 402b and 402c, however, four MSBs of signal FIR_DTO_E 432 are provided to overflow detection circuit OVDET 405. Also provided to OVDET 405 is a semi-static control signal MODE (e.g., PR 4 vs. EPR 4 mode selection) from an external controller (not shown) on path 406. The 2-bit signal BAND_OV_E is output from OVDET 405 on path 407 as an input to 3-way multiplexer 408, i.e., multiplexer 408 is capable of handling bit values 1, 0, and −1.

On paths 402, 402b, 402d and 402e, 5 bits of FIR_DTO_E 432 of the 4-bit remaining signal are provided as signal ERR_E to multiplexer 408 for selection by the control signal BAND_OV_E, provided on path 407. The binary designators 01111 (selected through the value of +1) and 10001 (selected through the value of −1) are used by multiplexer 408.

The output from the multiplexer 408 is provided as a 5-bit signal on path 411a to circuit NEG 412, where it is negated and passed via path 411c as a "signed" 6-bit signal to a simple two-way multiplexer 413. Also provided to multiplexer 413 is a 1-bit signal SIGN_CK_O over path 424.

SIGN_CK_O is generated by processing a 1-bit signal SIGN_0 sent along path 401 with the signal CLK 2 433 sent along path 404 to XOR gate 423, with SIGN_CK_0 being the output of XOR gate 423. The output from multiplexer 408 is also sent directly to multiplexer 413 as band overflow corrected error 5-bit signal ERR_OV_E on path 411b.

The 4 MSBs of signal FIR_DTO_E are provided over paths 402, 402b, 402d, and 402f to a separate Band Zero (B0) detector 409 for processing as the high-speed portion of signal processing has been accomplished. Also provided to circuit B0 409 on path 410 is signal MODE from an external controller (not shown) having the same function as signal MODE placed on path 406 described above. Providing signal MODE separately is necessary because the Band Zero detector 409 has been "separated" from all other calculations in the high-speed portion of the circuit.

Output from B0 circuit 409 is provided as a 1-bit signal BRAND_Z_ over path 414 to a multlplexer 415. Also provided directly to multiplexer 415 is a 6-bit signal BANDZ_ERR_E over paths 416 and 416a from multiplexer 413. Over paths 416 and 416b signal BANDZ_ERR_E is provided to summer 417 where it is combined with a signal over path 426 from the "mirror" processing of the odd bit stream FIR_DTO_0 431 (starting as an 8-bit signed signal at path 401). The output of the summer 417 is transmitted over path 418 for selection in multiplexer 415 of signals BAND_Z_E on path 414 and BANDZ_ERR_E on paths 416 and 416a, as well as the mirror signals BAND_Z_0 on path 425 and BANDZ_ERR_E on paths 426 and 426a.

A 6-bit signal is sent from the multiplexer 415 to register 420 over path 419. Also, incut to register 420 is a clock signal CLK, at the full period T, over path 421. Signal TC is provided as a 6-bit output over path 422 for use in a timing recovery loop or PLL (not shown). Note that this signal has been processed so that not only will the timing gradient control the timing recovery but also match the proper band of operation in the case where more than one PRML architectures is implemented, e.g., PR4 and EPR4, in a system such as a read channel of a mass data storage device. Note that separation of the B0 determination as depicted in boxes 450 and 451 allows processing on the high-speed portion of circuit 400 to be optimized.

It can be seen from FIG. 4 that the upper and lower halves of the circuit simultaneously processes their respective input signals along two paths. The input signal on each respective path is of unknown value, although the data may lie in one of three bands. The first band is referred to as "band 0" and has a zero value. The second band is referred to as "band 1", and has values above the values of band 0. The third band is referred to as band −1, and has a values below band 0. Although the circuit of FIG. 4 is described in the context of processing data that lies within one of three bands, it should be understood that the invention is applicable to processing signals having values in more than three bands, for example, five bands, as may encountered in an EPR4 tracking mode, and so on, with appropriate modifications that will be evident to those having ordinary skill in the art. As mentioned above, in any event, the data recovered from the transducer of the mass data storage device with which the circuit is associated may lay in a random distributed pattern about the center line of the respective band in which it lies.

The selection of an EPR4 or PR4 mode is made by the mode signal applied at mode inputs 406 and 410, and the corresponding inputs in the lower half of the circuit. As mentioned, the operation of the circuit 400 in the embodiment illustrated is intended for use in the data tracking mode of a PR4 mode signal, although with appropriate modifications, the circuit may be used in the data acquisition mode of an EPR4 mode signal.

As can be seen, the input signal on line 402 is processed first in the signal processing section denoted by the dotted line 453 that includes the overflow detector 405 and multiplexers 408 and 413. The processing in this section determines the value of the modulated error by the "hasty" band of the input signal and ascribes to it a predetermined sign, for purposes described below in detail. More particularly, at least a portion of the input signal on line 402 is conducted via line 402e to a multiplexer 408, and, additionally, to an overflow detector 405.

In the data tracking mode of operation, the overflow detector 405 determines whether the signal on line 402C exceeds a predetermined band value in either direction from −1 or 1 in the PR4 mode and −2 or 2 in the EPR4 mode. That is, the overflow detector 405 serves both as an overflow and underflow detector to determine whether the input signal exceeds the predetermined over and underflow limits. The meaning of the overflow or underflow condition is that the particular data point that is being processed lies above or below the band 1 or band −1 range in the PR4 mode (−2 or 2 for the EPR4 case). In that event, the overflow detector 405 sends a signal on line 407 to the multiplexer 408 to thereby select an overflow or underflow value, as shown. The particular overflow and underflow values selected, therefore, serve as maximum and minimum values that the data may assume as it is being processed. Otherwise, the data on line 402e is simply passed through the multiplexer 408 for further processing.

Simultaneously with the data processing in section 453, at least a portion of the data is further processed in the second path denoted by the dotted line box 450. More particularly, the input signal on line 402 is processed to determine whether it belongs to band 0, or, is centered about 0. Thus, if both of the input signals belong to band 0, the multiplexer 415 is controlled to provide a 0 value output on output line 419.

Thus, since the band 0 data is determined concurrently with processing of the input signal portions that belong to any of the bands, which is now simpler than the processisng of the prior art, the overall processing time for processing the input signal on line 402 is significantly reduced. Since the value determination is reduced from, for example, three band values to two band values, the overall processing time is reduced.

As noted above, the circuit 400 of FIG. 4 has upper and lower substantially identical mirror halves. The circuit indicated is designed to effect the following equation:

$$TG_k = B_k E_{k-1} - B_{k-1} E_k = T_{k-1} + T_k \quad (1)$$

in which:
k is a current time interval,
k−1 is an immediately preceding time interval,
$TG_k$ is a time gradient signal for a current time interval,
$B_k$ is a current band signal value in which $B_k \in \{-1,0,1\}$
$E_{k-1}$ is a preceding error signal of an immediately preceding time interval,
$B_{k-1}$ is a band signal value of an immediately preceding time interval in which $B_{k-1} \in \{-1,0,1\}$,
$E_k$, is an error signal of a current time interval, and $T_k$ and $T_{k-1}$ are band modulated errors.

It can be seen that equation (1) involves the sum or the modulated errors of a current bit value as well as immediately preceding bit value. These two terms are denoted odd and even values, so that for each time in a series of successive time sequences, the current value and next immediately preceding value can be determined. The sign of the products in equation (1) is controlled by the clocked exclusive-nor gate 403 and exclusive-or gate 423 so that the sum of the successive terms that is generated by the summer 417 produces an output that provides the value of the above set forth equation.

It can be appreciated that one circuit shown in FIG. 4 provides for the determination of three bands of signal values. This may be useful, for example, in the acquisition mode of an EPR4 signal, or in the tracking mode of a PR4 signal. Through the use of the band 0 detector circuits to control the multiplexer 415, the speed of the circuit 400 can be increased still further. More particularly, since the value of the signal at the output of the band 0 detectors is either 0 or 1, a rapid selection can be made between the inputs provided on lines 416, 426, 418 and 418, together with a value of 0, according to the following table:

| Output = | If $z_k$ = | And $z_{k-1}$ = |
|---|---|---|
| $T_{k-1} + T_k$ | 0 | 0 |
| $T_{k-1}$ | 0 | 1 |
| $T_k$ | 1 | 0 |
| 0 | 1 | 1 |

Thus, the input signals on lines 402 and 401 represent the present and immediately preceding data values that have been detected from the transducer of the mass data storage device with which the circuit 400 is associated. Once the circuit has determined an output value TG and the next sampled data value acquired, which becomes the current value, and the roles of the input lines 401 and 402 are reversed with regard to the presentation of the current and immediately preceding value.

Algorithmically, the calculation according to equation (1) above can be accomplished according to the following alogorithm:

1a) calculate $B_k\sim$ and $B_{k-1}\sim$
2a) calculate $Z_k$, $Z_{k-1}$
1b) compute $T_{k-1}\sim = B_k\sim E_{k-1}$, $T_k\sim = B_{k-1}\sim E_k$
1c) add $TG_k\sim = T_{k-1}\sim + T_k\sim$
3) finally, select the $TG_k$ output according to the table set forth above, in which:
k is a current time interval,
k−1 is an immediately preceding time interval,
$TG_k\sim$ is a time gradient signal for a current time interval,
$B_k\sim$ is a current "hasty" band signal value in which $B_k\sim \in \{-1,0,1\}$
$E_{k-1}\sim$, preceding error signal of an immediately preceding time interval,
$B_{k-1}\sim$ is a "hasty" band signal value of an immediately preceding time interval in which $B_{k-1}\sim \in \{-1,0,1\}$,
$E_k\sim$, is an error signal of a current time interval,
$T_k\sim$ and $T_{k-1}\sim$ are band modulated errors, and $z_k$ is 1 if the sample belongs to band 0.

Note in certain applications, the previous sample variables may be calculated during previous clock cycles.

Figure 5:
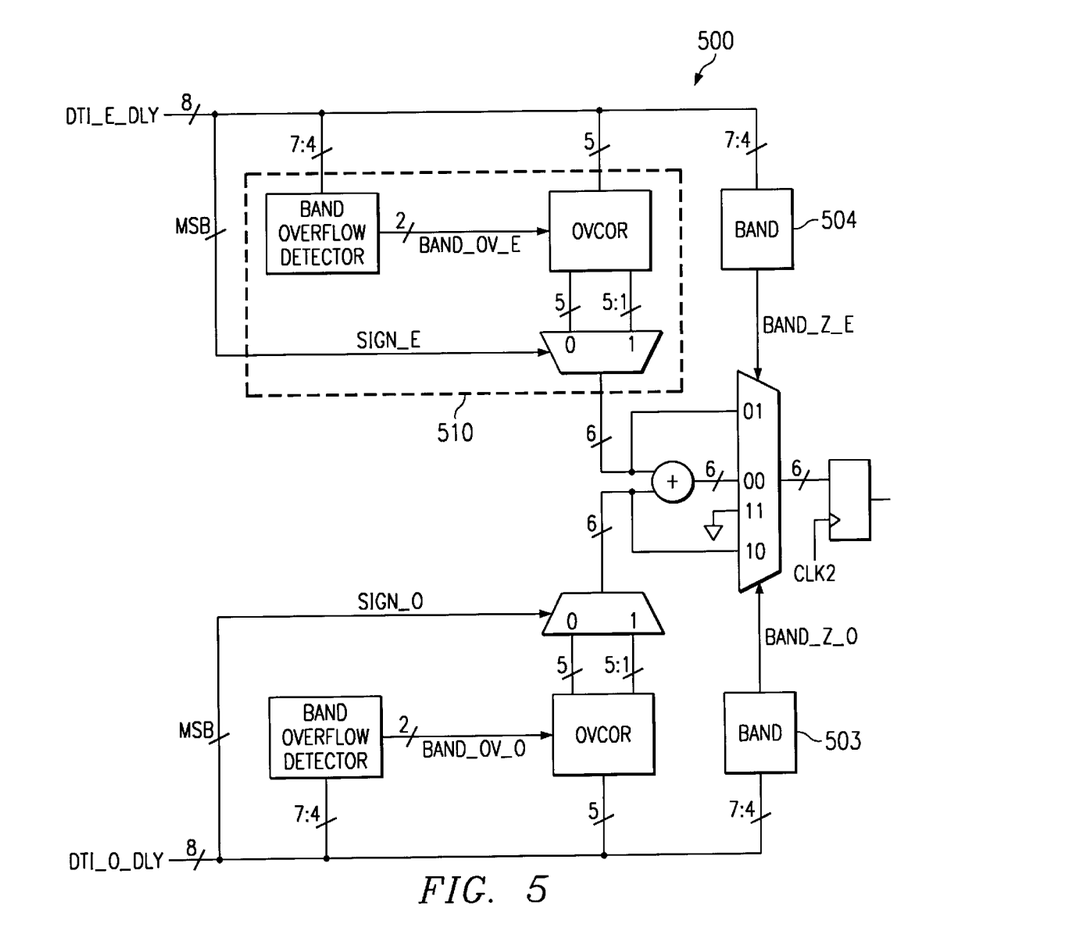
FIG. 5 depicts a gain gradient circuit having a band zero determination aside function similar to that of the phase detection circuit shown in FIG. 4.

Compare the separate similar B0 determination circuits 503 and 504 FIG. 5 of a gain gradient circuit 500 operating in the data-tracking mode. The difference between a gain gradient circuit in data-tracking mode and a timing recovery circuit such as 400 of FIG. 4 lies in the simpler overflow circuitry and band modulation circuitry 510 as compared to overflow circuitry shown in the dotted section 453 of the timing gradient circuit 400 of FIG. 4.

Although the invention has been described and illustrated with a certain degree of particularity, it is understood that the present disclosure has been made only by way of example, and that numerous changes in the combination and arrangement of parts can be resorted to by those skilled in the art without departing from the spirit and scope of the invention, as hereinafter claimed.

I claim:

1. A method for processing a sampled signal having an unknown value in one of at least three bands, at least one above a band zero, at least one below the band zero, and one of band zero, comprising:

processing at least a portion of said signal in a first path to determine a function of said signal;

concurrently processing at least a portion of said signal in a second path to determine if said signal belongs to the band zero;

producing an output signal that corresponds to band zero if said signal is determined to belong to band zero, otherwise producing an output signal having a value as determined in said first path.

2. The method of claim 1 wherein said processing said signal to determine a function of said signal comprises processing said signal to determine whether said signal is above or below band zero.

3. The method of claim 1 wherein said processing said signal to determine a value of said signal comprises processing said signal to determine whether said signal is above or below predetermined overflow and underflow values.

4. The method of claim 3 wherein said processing said signal to determine whether said signal is above or below overflow and underflow values comprises detecting an overflow or underflow state in said signal, and using said overflow or underflow state detection to control a signal multiplexer that selects respective predetermined overflow and underflow values.

5. The method of claim 1 wherein the output signal is used as a feedback signal.

6. The method of claim 1 wherein the feedback signal is used for an input to a timing recovery circuit.

7. The method of claim 1 wherein the feedback signal is used for an input to a gain control circuit.

8. A method for processing a digital signal having first and second time sequential values, each value lying in an unknown one of at least three bands, one above zero, one below zero, and one of zero, comprising:

processing at least a portion of a first time sequential value of said signal in a first path to determine a first output value of said first time sequential value of said signal;

concurrently processing at least a portion of said first time sequential value of said signal in a second path to produce a signal indicating if said first time sequential value of said signal corresponding to band zero;

processing at least a portion of a second time sequential value of said signal in a third path to determine a second output value of said second time sequential value of said signal;

concurrently processing at least a portion of a second time sequential value of said signal in a fourth path to produce a signal indicating if said second time sequential value signal is of band zero;

adding said first and second output values of said signals;

multiplexing said first output value, said second output value and said added first and second output values according to said signals indicating if said first and second time sequential value signals belong to band zero to produce an output signal of value of zero if said signals are both determined to belong to band zero, to be said first output value if said signal indicating if said second time sequential value signal belongs to band zero indicates said second time sequential value signal belongs to band zero, to be said second output value if said signal indicating if said first time sequential value signal belongs to band zero indicates said first time sequential value signal belongs to band zero, and said added said first and second output values if neither said signals indicating if said first and second time sequential values signal belongs to band zero indicates an addition of the modified errors.

9. The method of claim 8 further comprising alternately changing the sign of one of said first and second time sequential value signals in accordance with a synchronizing clock signal prior to said adding.

10. The method of claim 9 wherein said method calculates a time gradient signal according to the following equation: $TG_k = B_k E_{k-1} - B_{k-1} E_k$, wherein, k is a current time interval, k−1 is an immediately preceding time interval, $TG_k$ is a time gradient signal for a current time interval, $B_k$ is a current band signal value, $E_{k-1}$ is a preceding error signal of an immediately preceding time interval, $B_{k-1}$ is a band signal value of an immediately preceding tome interval, and $E_k$, is an error signal of a current time interval.

11. The method of claim 10 wherein said $E_{k-1}$ and $B_{k-1}$ are calculated during said immediately preceding time interval.

12. The method of claim 8 wherein said processing said signal to determine a value of said signal comprises processing said signal to determine whether said sional is above or below zero.

13. The method of claim 12 wherein said processing said signal to determine whether said signal is above or below zero comprises detecting an overflow stale in said signal, and using said overflow state detection to control a signal multiplexer that selects between some large positive and negative values of the error signal.

14. The method of claim 8 wherein the output signal is used as a feedback signal.

15. The method of claim 8 wherein the feedback signal is used for an input to a timing recovery circuit.

16. The method of claim 8 wherein the feedback signal is used for an input to a gain control circuit.

17. A method for processing a digital signal having a bit rate, comprising:

providing separate paths, A and B, of operation; and processing separate parts of the digital signal on each path while referencing said path A to said path B.

18. The method of claim 17 wherein said method further comprises:

providing an overflow detection circuit, having an output, in path A;

providing an error correction circuit, having an output, in path A;

providing a band and overflow detection circuit for bands +1 and −1, having an output, in path A;

wherein said overflow detection circuit also comprises a multiplexer for receiving said output from said overflow detection circuit;

providing a band detection circuit in path B, for detecting band zero;

providing a multiplexer, having an output, for processing cutouts from each of said paths A and B;
providing a reference clock of half of a data rate frequency, having an output; and
outputting said outputs from said multiplexer and said reference clock as a control signal.

19. The method of claim 18 further comprising providing a register for processing and outputting said outputs from said multiplexer and said reference clock as said control signal.

20. The method of claim 17 wherein the processed digital signal is used as a feedback signal.

21. The method of claim 20 wherein the feedback signal is used for an input to a timing recovery circuit.

22. The method of claim 20 wherein the feedback signal is used for an input to a gain control circuit.

23. A system for processing a digital signal having an unknown value in one of at least three bands, one above a band zero, one below the band zero, and one of band zero, comprising:
a first circuit in a first path to receive at least a portion of said signal to determine a function of said signal;
a second circuit in a second path to receive at least a portion of said signal to determine if said signal belongs to the band zero concurrently with an operation of said first circuit to produce an output signal that corresponds to band 0; and
an output circuit to produce an output signal of value of zero if said signal is determined to belong to band zero, otherwise to produce an output signal having a value of said signal.

24. The system of claim 23 wherein said first circuit processes said signal to determine whether said signal is above or below band zero.

25. The system of claim 23 wherein said first circuit processes said signal to determine whether said signal is above or below predetermined overflow and underflow values.

26. The system of claim 25 wherein said first circuit detects an overflow or underflow state in said signal, and using said overflow or underflow state detection controls a signal multiplexer that selects respective predetermined maximum overflow and minimum underflow values.

27. The system of claim 23 wherein the output signal is used as a feedback signal.

28. The system of claim 23 wherein the feedback signal is used for an input to a liming recovery circuit.

29. The system of claim 23 wherein the feedback signal is used for an input to a gain control circuit.

30. A system for processing a digital signal having first and second time sequential values, each value lying in an unknown one of at least three bands, one above zero, one below zero, and one of zero, comprising:
a first circuit for processing at least a portion of a first time sequential value of said signal in a first path to determine a first output value of said first time sequential value of said signal;
a second circuit for concurrently processing at least a portion of said first time sequential value of said signal in a second path to produce a signal indicating if said first time sequential value of said signal has a value of zero;
a third circuit for processing at least a portion of a second time sequential value of said signal in a third path to determine a second output value of said second time sequential value of said signal;
a fourth circuit for concurrently processing at least a portion of a second time sequential value of said signal in a fourth path to produce a signal indicating if said second time sequential value signal has a value of zero;
an adder for adding said first and second cutout values of said signals; and
a multiplexer for multiplexing said first output value, said second output value and said added first and second cutout values according to said signals indicating if said first and second time sequential value signals have a value of zero to produce an output signal of value of zero if said signals are both determined to belong lo band zero, to be said first output value if said signal indicating if said second time sequential value signal has a value of zero indicates said second time sequential value signal has a value of zero, to be said second output value if said signal indicating if said first time sequential value signal has a value of zero indicates said first time sequential value signal has a value of zero, and said added said first and second output values if neither said signals indicating if said first and second time sequential values signal has a value of zero indicates said first and second time sequential value signals has a value of zero.

31. The system of claim 30 further comprising a circuit for alternately changing the sign of one of said first and second time sequential value signals in accordance with a synchronizing clock signal prior to said adding.

32. The system of claim 30 wherein said system calculates a time gradient signal according to the equation $TG_k = B_k E_{k-1} - B_{k-1} E_k$, wherein, k is a current time interval, k−1 is an immediately preceding time interval, $TG_k$ is a time gradient signal for a current time interval, $B_k$ is a current band signal value, $E_{k-1}$ is a preceding error signal of an immediately preceding time interval, $B_{k-1}$ is a band signal value of an immediately preceding time interval, and $E_k$, is an error signal of a current time interval.

33. The system of claim 30 wherein said first and third circuits determine whether said signal is above or below zero.

34. The system of claim 33 wherein said first and third circuits detect an overflow state in said signal, and using said overflow state detection to control a signal multiplexer that selects between 1 and −1 values.

35. The system of claim 30 wherein the output signal is used as a feedback signal.

36. The system of claim 30 wherein the feedback signal is used for an input to a timing recovery circuit.

37. The system of claim 30 wherein the feedback signal is used for an input to a gain control circuit.

38. A system for processing a digital signal having an initial bit rate, comprising:
separate paths A and B for processing the digital signal; and
a circuit for facilitating referenced processing between said separate paths;
wherein the processing on path A is accomplished with concurrent processing on path B, thereby enabling processing on path B at approximately the initial bit rate of the digital signal.

39. The system of claim 38 wherein said structure employs:
an overflow detection circuit, having an output, in path A;
an error correction circuit, having an output, in path A;
a band and overflow detection circuit for bands +1 and −1, having an output, in path A;

wherein said overflow detection circuit also comprises a multiplexer that receives said output from said overflow detection circuit;

a band detection circuit in path B;

wherein band 0 is detected;

a multiplexer, having an output, for processing outputs from each of said paths A and B;

a reference clock, having an output; and a circuit for processing and outputting said outputs from said multiplexer and said reference clock as a control signal.

40. The system of claim 39 wherein said circuit for processing and outputting said outputs from said multiplexer and said reference clock as a control signal comprises a register.

41. The system of claim 38 wherein the processed digital signal is used as a feedback signal.

42. The system of claim 41 wherein the feedback signal is used for an input to a timing recovery circuit.

43. The system of claim 41 wherein the feedback signal is used for an input to a gain control circuit.

44. A system for processing a digital signal having a bit rate, comprising:

separate paths A and B for processing the digital signal; and a structure facilitating referenced processing between said separate paths, wherein the processing on path A may be accomplished at a different time than that on path B, thus enabling processing on path B near the bit rate of the digital signal.

45. The system of claim 44 wherein said structure employs:

an overflow detection circuit, having an output, in path A;

an error detection circuit, having an output, in path A;

a band and overflow detection circuit for bands +1 and −1, having an output, in path A;

wherein said overflow detection circuit also comprises a multiplexer that receives said output from said overflow detection circuit;

a band detection circuit in path B;

wherein band zero is detected;

a multiplexer, having an output, for processing outputs from each of said paths A and B, a reference clock, having an output; and a register for processing and outputting said outputs from said multiplexer and said reference clock as a control signal.

46. The system of claim 44 wherein the processed digital signal is used as a feedback signal.

47. The system of claim 46 wherein the feedback signal is used for an input to a timing recovery circuit.

48. The system of claim 46 wherein the feedback signal i used for an input to a gain control circuit.

49. The system of claim 44 wherein said system is a mass data storage system.

50. The system of claim 49 wherein said mass data storage system is a disk drive.

\* \* \* \* \*